United States Patent [19]

Terada

[11] Patent Number: 5,635,698
[45] Date of Patent: Jun. 3, 1997

[54] TERMINAL DEVICE, DATA SETTING METHOD AND BAR CODE CREATING METHOD

[75] Inventor: Kyouko Terada, Kawasaki, Japan

[73] Assignee: Fujitsu Limited, Kawasaki, Japan

[21] Appl. No.: 330,805

[22] Filed: Oct. 28, 1994

[30] Foreign Application Priority Data

Feb. 22, 1994 [JP] Japan ................................. 6-024069

[51] Int. Cl.$^6$ .................................................. G06K 7/10
[52] U.S. Cl. ............................ 235/462; 235/454; 235/472
[58] Field of Search .................................. 235/462, 432, 235/454, 472, 436, 467

[56] References Cited

U.S. PATENT DOCUMENTS

| | | | |
|---|---|---|---|
| 4,721,849 | 1/1988 | Davis et al. | 235/472 |
| 4,825,058 | 4/1989 | Poland | 235/472 |
| 4,841,132 | 6/1989 | Kajitani et al. | 235/472 |
| 4,861,972 | 8/1989 | Elliott et al. | 235/436 |
| 4,866,257 | 9/1989 | Elliott et al. | 235/436 |
| 4,868,375 | 9/1989 | Blanford | 235/462 |
| 4,934,846 | 6/1990 | Gilham | 235/432 |
| 4,952,785 | 8/1990 | Kikuda | 235/432 |
| 5,120,943 | 6/1992 | Bowe | 235/375 |
| 5,185,514 | 2/1993 | Wile, Jr. et al. | 235/454 X |
| 5,239,168 | 8/1993 | Durst, Jr. et al. | 235/432 |
| 5,256,865 | 10/1993 | Wile, Jr. et al. | 235/467 X |
| 5,272,322 | 12/1993 | Nishida et al. | 235/462 |
| 5,387,783 | 2/1995 | Nihim et al. | 235/975 |
| 5,469,291 | 11/1995 | Plesko | 235/461 |

FOREIGN PATENT DOCUMENTS

| | | | |
|---|---|---|---|
| 0119479 | 7/1984 | Japan | 235/462 |
| 1226088 | 9/1989 | Japan | 235/462 |
| 0318181 | 12/1989 | Japan | 235/462 |

OTHER PUBLICATIONS

Iuteunec, "9511 Online Reader System Manual", Intercec Corporation Dec. 1986.
IBM Technical Disclosure Bulletin, "Read/Write Stylus", Uberbacher, vol. 19, No. 1, Jun. 1976, pp. 177–178.

*Primary Examiner*—Donald T. Hajec
*Assistant Examiner*—Le Thien Minh
*Attorney, Agent, or Firm*—Staas & Halsey

[57] ABSTRACT

A terminal device includes a memory unit, a converting unit, a printing unit, a bar code reading unit and a creating unit. The memory unit stores the inputted preset data. The converting unit converts the preset data stored in the memory unit into bar code data. The printing unit prints the bar code data converted by the converting unit. The bar code reading unit reads the bar codes printed by the printing unit. The creating unit creates the preset data from the bar codes read by the bar code reading unit and sets the created preset data.

10 Claims, 13 Drawing Sheets

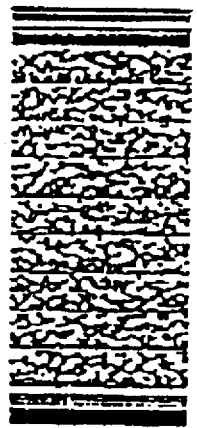
FIG.9A PDF417
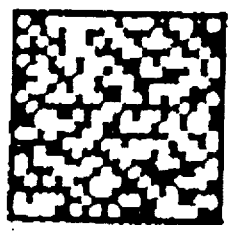
FIG.9B DATACODE
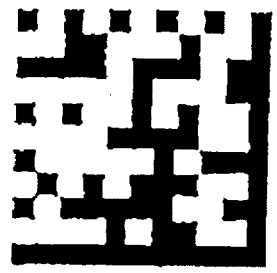
FIG.9C VERICODE
FIG.9D CODE 16K 0001234567890 5

3-MODULE WIDTH  1-MODULE WIDTH

| NUMERICAL VALUE | ALPHABETIC CAPITAL | ALPHABETIC SMALL CHARACTER | MIXTURE | SPECIAL CHARACTER |
|---|---|---|---|---|
| 0<br>1<br>2<br>.<br>.<br>.<br>25<br>26 | A<br>B<br>C<br><br><br><br>Z<br>SPACE | a<br>b<br>c<br><br><br><br>z<br>SPACE | 0<br>1<br>2<br><br><br><br><br>SPACE | :<br><<br>><br><br><br><br>?<br>{<br>} |
| 27<br>28<br>29 | SHIFT CODE | | | . |

FIG.14

| CODE WORD VALUE | X-SEQUENCE, CLUSTER 0 |
|---|---|
| 0 | 3 1 1 1 1 1 3 6 |
| 1 | 4 1 1 1 1 1 4 4 |
| 2 | |
| . | |
| . | |
| 899 | 1 3 3 2 3 1 1 3 |
| 900 | 1 4 2 3 2 2 1 2 |
| 928 | 2 1 5 1 4 1 1 2 |

CLUSTER 3

| 928 | 1 2 6 2 2 2 2 1 |

CLUSTER 6

| 928 | 2 4 5 1 1 2 1 1 |

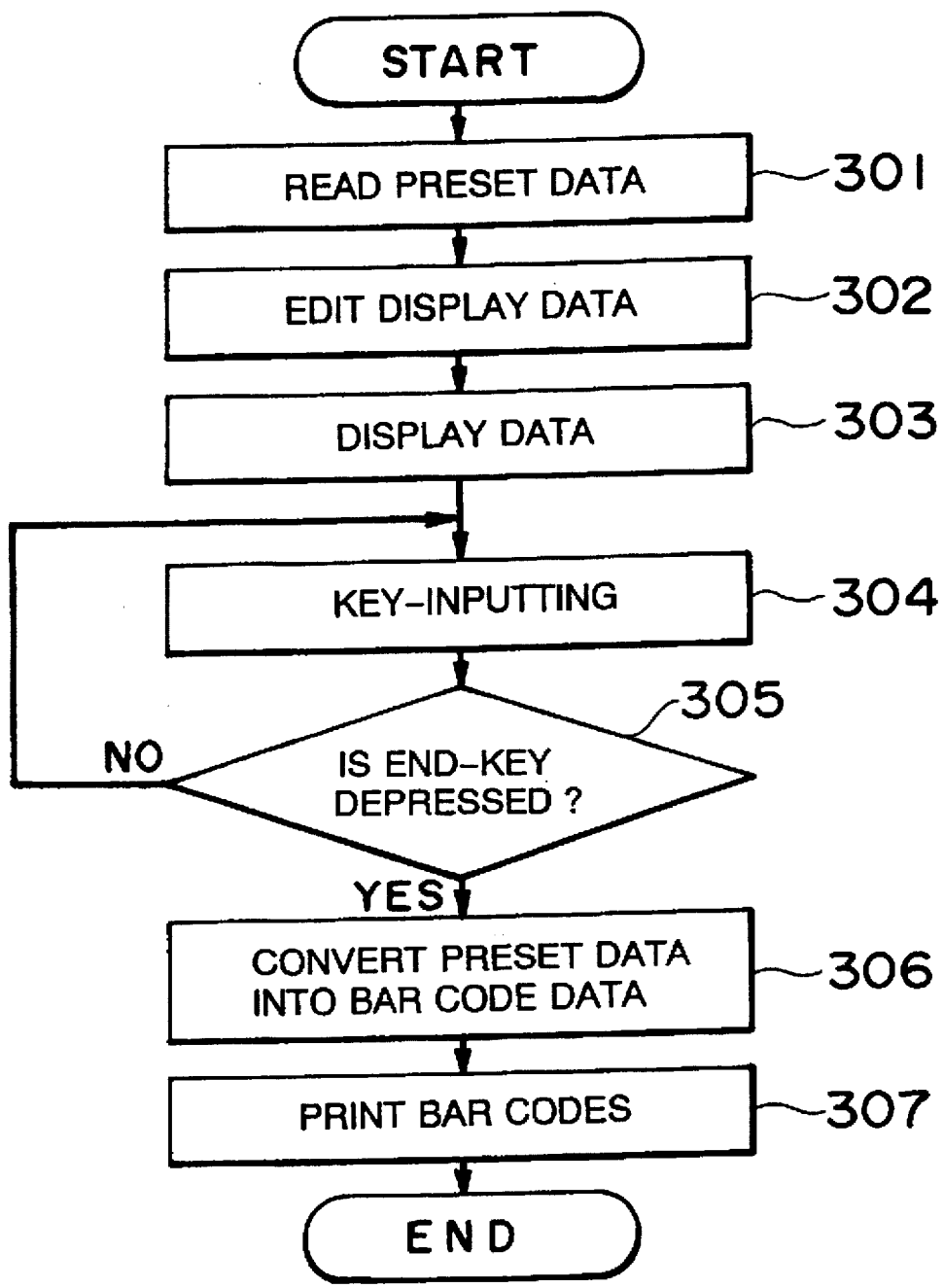

FIG.16

| ITEM | SET VALUE | ITEM | SET VALUE |
|---|---|---|---|
| TYPE OF CARD | 1 | ISSUANCE BASE VALUE | 1 |
| FORM | 1 | ISSUANCE BASE AMOUNT | 200 |
| INHIBITION OF PRINTING | 2 | ISSUANCE MINIMUM AMOUNT | 100 |
| ISSUANCE OF CARD | 2 | COLLECTION STANDARD AMOUNT | 10 |
| INPUTTING OF PASSWORD | 3 | FULL POINT | 500 |

END → "E"

FIG.17

| CHANGE OF PRESET VALUE | | | |
|---|---|---|---|
| ITEM | SET VALUE | ITEM | SET VALUE |
| TYPE OF CARD | 1 | ISSUANCE BASE VALUE | 1 |
| FORM | 1 | ISSUANCE BASE AMOUNT | 100 |
| INHIBITION OF PRINTING | 2 | ISSUANCE MINIMUM AMOUNT | 100 |
| ISSUANCE OF CARD | 2 | COLLECTION BASE AMOUNT | 10 |
| INPUTTING OF PASSWORD | 1 | FULL POINT | 500 |

END → "E"

FIG.18

PRESET SETTING LIST

| ITEM | | SET VALUE |
|---|---|---|
| 1 | TYPE OF CARD | 1 |
| 2 | FORM | 1 |
| 3 | INHIBITION OF PRINTING | 2 |
| 4 | ISSUANCE OF CARD | 2 |
| 5 | INPUTTING OF PASSWORD | 3 |
| 6 | ISSUANCE BASE VALUE | 1 |
| 7 | ISSUANCE BASE AMOUNT | 200 |
| 8 | ISSUANCE MINIMUM AMOUNT | 100 |
| 9 | COLLECTION BASE AMOUNT | 10 |
| 10 | FULL POINT | 500 |

SET BAR CODE

TERMINAL DEVICE, DATA SETTING METHOD AND BAR CODE CREATING METHOD

BACKGROUND OF THE INVENTION

The present invention relates to a terminal device, a data setting method for setting preset data of operating conditions to a memory and a bar code creating method for creating bar codes.

In recent years, a variety of terminal devices and operating software have been commercially available. The terminal device incorporates a memory to which preset data of operating conditions are stored.

The terminal device is operated under a variety of operating conditions by changing the preset data.

Hitherto, the method of setting the preset data entailed, for example, the following two setting methods.. A first setting method is a method of changing the preset data stored in the memory by inputting a change value of preset data of terms to be changed from keys provided in the terminal device.

Further, a second setting method comprises storing the data to the memory when the terminal device is operated by or connected to a remote terminal. That is, when the terminal device is connected to a host computer, storing in the memory, set data received by the terminal device from the host computer via a line.

If the preset data stored in the memory is changed by key inputting, however, there is a case where inconvenience is produced. Typically, all the preset data can not be changed by inputting key.

Also, when plural items of data are set from the keys to the memory, a considerable amount of time is taken. There is also a case in which a mistake input from the keys is caused.

In the second method, the terminal device is often operated offline. In this case, the set data transmitted from the host computer can not be set to the memory incorporated into the terminal device.

In addition, customizing information increases as the system becomes complicated. For this reason, the amount of the required preset data also increases. For instance, when a plurality of users employ the package software under different conditions respectively, an install floppy disk, in which the conditions are set for every individual user, has to be prepared.

The preset data has to be previously stored the memory, incorporated into the terminal device, by use of a program stored on the install floppy. Consequently, the number of software packages increases in proportion to the number of the users, and program management is therefore complicated.

SUMMARY OF THE INVENTION

It is a first object of the present invention to provide a terminal device and a data setting method that are capable of quickly easily storing preset data in a memory and simplifying program management.

It is a second object of the present invention to provide a bar code creating method for creating bar codes from inputted preset data.

A terminal device according to a first aspect of the present invention comprises a memory unit, a converting unit and a printing unit. The memory unit stores inputted preset data. The converting unit converts the preset data stored in the memory unit into bar code data. The printing unit prints the bar code data converted by the converting unit.

Further, the bar codes, outputted to the printing unit, are two-dimensional bar codes inclusive of a plurality of code words in lengthwise and crosswise directions, respectively. Each code word is composed of a module string in which bars and spaces are combined.

The terminal device may further comprise a display unit for displaying the inputted preset data.

The terminal device may further comprise a changing unit for changing the inputted preset data.

A terminal device according to a second aspect of the present invention comprises a bar code reading unit and a creating unit. The bar code reading unit reads bar codes recorded with set data.

The creating unit creates preset data from the bar codes read by the bar code reading unit and sets the created preset data.

Herein, the bar codes are two-dimensional bar codes inclusive of a plurality of code words in lengthwise and crosswise directions, respectively. Each code word is composed of a module string in which bars and spaces are combined.

The terminal device further comprises a display unit for displaying the created preset data.

The terminal device further comprises a changing unit for changing the created preset data.

The terminal device may further comprise a converting unit and a printing unit. The converting unit converts the changed preset data and the created preset data into the bar code data. The printing unit prints the bar code data converted by the converting unit.

The converting unit may include a first table and a second table. The first table serves to convert the preset data into numerical values of the code words.

The second table serves to convert the numerical values of the code words into values of widths of bars and spaces that are alternately arranged in the module string.

The creating unit may include a first table and a second table. The first table serves to convert the values of the widths of the bars and the spaces that are read by the bar code reading unit into the numerical values of the code words. The second table serves to convert the numerical values of the code words into the. preset data.

The terminal device of the present invention includes the memory unit, the converting unit and the printing unit and, at the same time, may further include the bar code reading unit and the creating unit.

Further, a bar code creating method according to the present invention comprises a storing step, a converting step and a printing step. The storing step is to store inputted preset data.

The converting step is to convert the preset data stored in the storing step into bar code data. The printing step is to print-output the bar code data converted in the converting step.

The bar code creating method may further comprise a displaying step of displaying the inputted preset data.

The bar code creating method may further comprise a changing step of changing the inputted preset data.

Also, a data setting method of the present invention comprises a bar code reading step and a creating step. The bar code reading step is to read bar codes recorded with set data.

The creating step is to create preset data from the bar codes read in the bar code reading step and set the created preset data.

The bar codes are two-dimensional bar codes inclusive of a plurality of code words in lengthwise and crosswise directions, respectively. Each code word is composed of a module string in which bars and spaces are combined.

The data setting method may further comprise a displaying step of displaying the created preset data.

The data setting method may further comprise a changing step of changing the created preset data.

The data setting method may further comprise a converting step and a printing step. The converting step is to convert the changed preset data and the created preset data into the bar code data. The printing step is to print the bar code data converted in the converting step.

The converting step may include a first table step and a second table step. The first table step is to create a first table for converting the preset data into numerical values of the code words.

The second table step is to create a second table for converting the numerical values of the code words into values of widths of bars and spaces that are alternately arranged in the module string.

The creating step may include a first table step and a second table step. The first table step is to create a first table for converting the values of the widths of the bars and the spaces that are read in the bar code reading step into the numerical values of the code words.

The second table step is to create a second table for converting the numerical values of the code words into the preset data.

Furthermore, the present invention includes the storing step, the converting step and the printing step and, at the same time, may comprise a bar code reading step and a creating step.

According to the present invention, the memory unit stores the inputted preset data. The converting unit converts the preset data stored in the memory unit into the bar code data. Further, the printing unit is capable of outputting and printing the bar code data converted by the converting unit.

Also, the bar code reading unit reads the bar codes recorded with the set data. The creating unit creates the preset data from the bar codes read by the bar code reading unit and sets the created preset data.

Accordingly, the preset data to be set to the terminal device can be quickly readily set without key-inputting.

Further, the bar codes are the two-dimensional bar codes composed of the plural items of preset data, and, therefore, the plural items of preset data can be batch-read.

The preset data is displayed in the display unit, and hence it is possible to confirm the contents of the preset data.

Further, since the changing unit is capable of changing the inputted preset data, the preset data conforming with the user's conditions is set.

Moreover, the converting unit converts the changed preset data and the inputted preset data into the bar code data. The printing unit prints the bar code data converted by the converting unit.

Accordingly, the changed preset data and the inputted preset data are bar-coded.

The first table serves to convert the preset data into the numerical values of the code words. The second table serves to convert the numerical values of the code words into the values of the widths of the bars and the spaces that are alternately arranged in the module string, thereby creating the bar codes.

The values of the widths of the bars and the spaces that are read by the bar code reading unit are converted into the numerical values of the code words by use of the first table. The numerical values of the code words are converted into the preset data by use of the second table, and the changed preset data is thereby created.

BRIEF DESCRIPTION OF THE DRAWINGS

Other objects and advantages of the present invention will become apparent during the following discussion in conjunction with the accompanying drawings, in which:

FIGS. 9A–9D are diagrams showing one example of two-dimensional bar codes in the third embodiment; FIG. 9A is a diagram showing "PDF417"; FIG. 9B is a diagram showing "DATACODE"; FIG. 9C is a diagram showing "VERICODE"; FIG. 9D is a diagram showing "CODE16K";

FIG. 14 is a diagram showing an X-sequence table in the third embodiment;

FIG. 15 is a flowchart showing a bar code creating method in accordance with the third embodiment of the present invention;

FIG. 16 is a diagram showing one example of displaying the preset data inputted in the third embodiment;

FIG. 17 is a diagram showing one example of displaying the preset data changed in the third embodiment;

FIG. 18 is a diagram showing a preset data setting list in the third embodiment.

DETAILED DESCRIPTION OF THE PREFERRED EMBODIMENTS

A terminal device, a bar code creating method and data setting method according to the present invention will hereinafter be described with reference to the drawings.

First Embodiments

Figure 1:
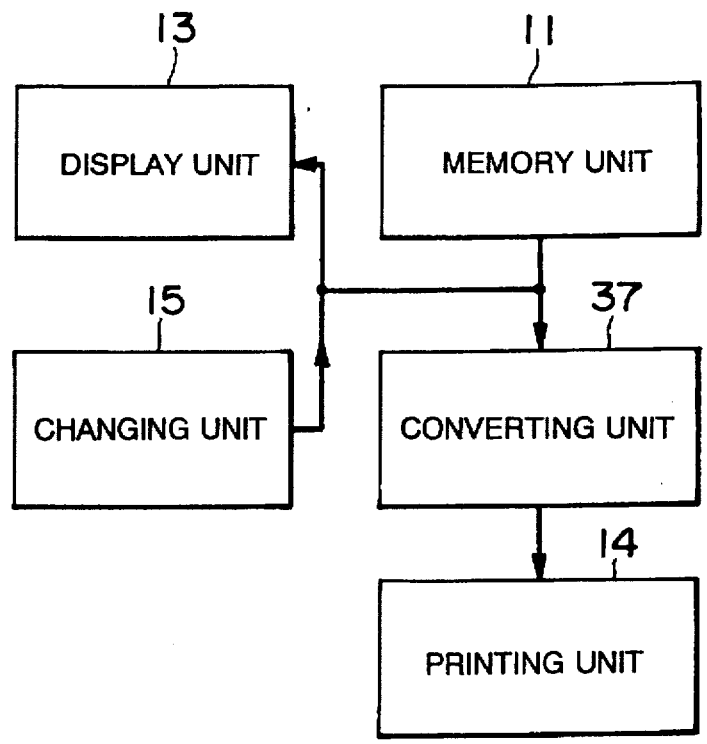
FIG. 1 is a block diagram illustrating a construction of a terminal device in accordance with first embodiment of the present invention.

FIG. 1 is a block diagram illustrating a construction of a terminal device in accordance with a first embodiment of the present invention. The terminal device prints a bar code which a preset data representing operating condition is stored based on inputted data. The terminal device in the first embodiment includes a memory unit 11, a converting unit 37 and a printing unit 14. The memory unit 11 stores items of inputted preset data.

The memory unit 11 is, e.g., a floppy disk, a hard disk, a magnetic tape device, a read-only-memory (ROM) and a random access memory (RAM).

The converting unit 37 is connected to the memory unit 11. The converting unit 37 converts the preset data stored in the memory unit 11 into bar code data. The converting unit 37 is, e.g., a conversion table or the like provided in the memory.

The printing unit is connected to the conversion unit 37. The printing unit 14 prints the bar code data converted by the converting unit 37. The printing unit 14 is, e.g., a printer or the like.

The bar codes outputted from the printing unit 14 are two-dimensional bar codes including a plurality of code words in lengthwise and crosswise directions. The code word is composed of a module string in which bars and spaces are combined.

The terminal device further includes a changing unit 15 and a display unit 13. The changing unit 15 is connected to the memory unit 11. The changing unit 15 changes the preset data stored in the memory unit 11. The changing unit 15 changes the preset data by input value from e.g., a keyboard, a touch panel and a mouse.

The display unit 13 is connected to the memory unit 11. The display unit 13 displays the preset data stored in the memory unit 11. The display unit 13 is, e.g., a cathode ray tube (CRT) and a liquid crystal display device.

Figure 2:
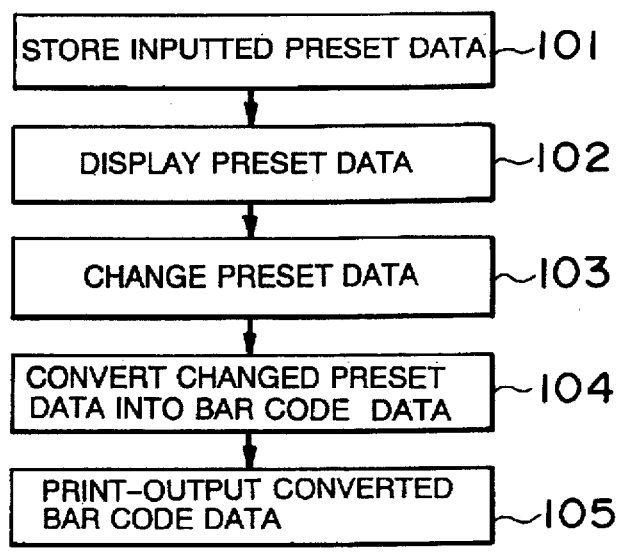
FIG. 2 is a flowchart showing a bar code creating method in accordance with the first embodiment of the present invention.

FIG. 2 is a flowchart showing the bar code creating method in accordance with the first embodiment of this invention. The bar code creating method actualized by the above terminal device shown in FIG. 1 will be discussed.

First, the inputted preset data is stored in the memory unit 11 (step 101). The inputted preset data is inputted from key, is stored in a floppy disk. The preset data is inputted by setting in the terminal device. The preset data stored in the memory unit 11 is displayed on the display unit 13 (step 102).

Next, the preset data displayed on the display unit 13 is changed into an item of change preset data by the changing unit 15 (step 103). When the preset data is erroneous, the preset data is changed to desired value. Then, the preset data changed by the changing unit 15 is converted into an item of bar code data by the converting unit 37 (step 104).

Finally, the bar code data converted by the converting unit 37 is printed on a sheet by the printing unit 14 or is otherwise outputted (step 105).

According to such a construction, the preset data stored in the memory unit 11 is converted into the bar codes by the converting unit 37. The bar codes can be printed by the printing unit 14. The bar code is read by a bar code reader, and is converted to the preset data. Also, the preset data is displayed on the display unit 13, and, therefore, contents of the present data can be confirmed.

Further, since the changing unit 15 is capable of changing the inputted preset data, the preset data can be conformed with the user's conditions.

Second Embodiments

Figure 3:
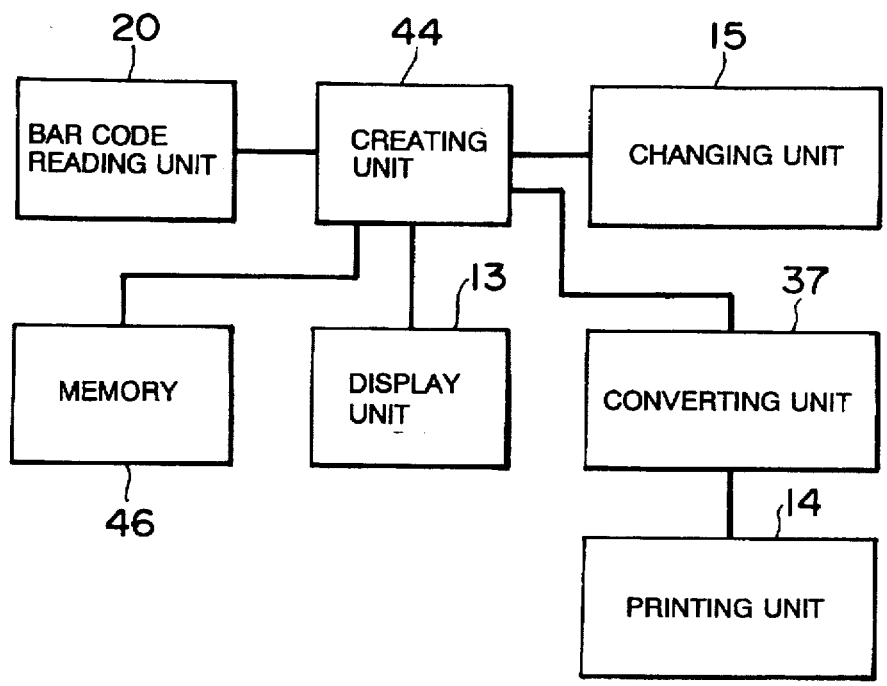
FIG. 3 is a block diagram illustrating a construction of the terminal device in accordance with a second embodiment of the present invention.

Given next is a discussion on the terminal device and the data setting method in accordance with a second embodiment of the present invention. FIG. 3 is a block diagram illustrating a construction of the terminal device in accordance with the second embodiment of the present invention. The terminal device converts a bar code to preset data, converted preset data is set to operate the terminal device.

The terminal device in the second embodiment includes a bar code reading unit 20, a creating unit 44, the display unit 13 and the changing unit 15. The bar code reading unit 20 reads the bar codes on which items of presetting data are recorded. The bar code reading unit 20 is, e.g., a bar code reader. The bar code is read to convert the preset data.

The creating unit 44 is connected to the bar code reading unit 20. The creating unit 44 creates the preset data from the bar codes read by the bar code reading unit 20 and sets the thus created preset data. The creating unit 44 is constructed of, e.g., a CPU and a preset data creation program stored in the memory.

The bar codes are two-dimensional bar codes inclusive of a plurality of code Words in the lengthwise and crosswise directions. Each code word is composed a module string in which the bars and the spaces are combined.

The display unit 13 is a CRT and connected to the creating unit 44. The display unit 13 displays the preset data created by the creating unit 44.

The changing unit 15 is a keyboard and connected to the creating unit 44. The changing unit 15 changes the preset data created by the creating unit 44.

The terminal device further includes a converting unit 37 and a printing unit 14. The converting unit 37 is connected to the creating unit 44. The converting unit 37 converts the changed preset data and a inputted preset data into the bar code data. The inputted preset data is the preset data converted by the creating unit 44.

The printing unit 14 is a printer and connected to the converting unit 37. The printing unit 14 prints the bar code converted by the converting unit 37.

Figure 4:
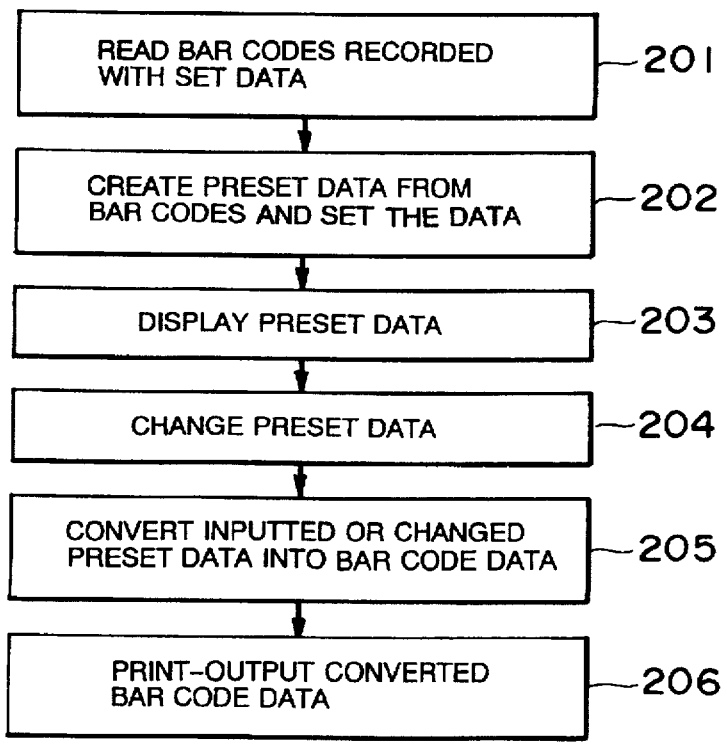
FIG. 4 is a flowchart showing a data setting method in accordance with the second embodiment of the present invention.

FIG. 4 is a flowchart showing the data setting method in accordance with the second embodiment. The data setting method actualized by the terminal device shown in FIG. 3 will be described.

To start with, the bar codes recorded with the setting data are read by the bar code reading unit 20 (step 201). Next, the preset data are created by the creating unit 44 from the bar codes read by the bar code reading unit 20, and the thus created preset data is set to the memory 46 (step 202). Operation of the terminal device is set by the preset data stored to the memory 46.

Further, the preset data created by the creating unit 44 is displayed on the display unit 13 (step 203). When the preset data is in error, the preset data displayed on the display unit 13 is changed into the change preset data (step 204).

Next, the changed preset data or the inputted preset data is converted into the bar code data by the converting unit 37 (step 205).

The bar code data converted by the converting unit 37 is printed, or otherwise output, on the sheet by the printing unit 14 (step 206).

Thus, the printed bar codes are read by the bar code reading unit 20. The bar codes are converted into the preset data by the creating unit 44. The preset data is set to the memory of the terminal device.

Accordingly, the preset data to be set to the terminal device can be quickly easily set through no key-inputting. Also, the preset bar codes are the two-dimensional bar codes composed of the plural items of preset data, and, hence, the plural items of preset data can be batch-read.

Further, the preset data is displayed on the display unit 13, and it is therefore possible to confirm the contents of these items of preset data.

Moreover, the changing unit 15 is capable of changing the inputted preset data, and, therefore, the preset data can be conformed with the user's conditions.

Additionally, the displayed preset data is converted into the bar code data by the converting unit 37. The bar code data can be also printed by the printing unit 14.

Third Embodiment

Next, there will be explained the terminal device, the bar code creating method and the data setting method in accordance with a third embodiment of the present invention. The terminal device print-outputs a bar code in which a preset data is stored based on inputted data. The terminal device converts the bar code to preset data, converted preset data is set to operate the terminal device.

Figure 5:
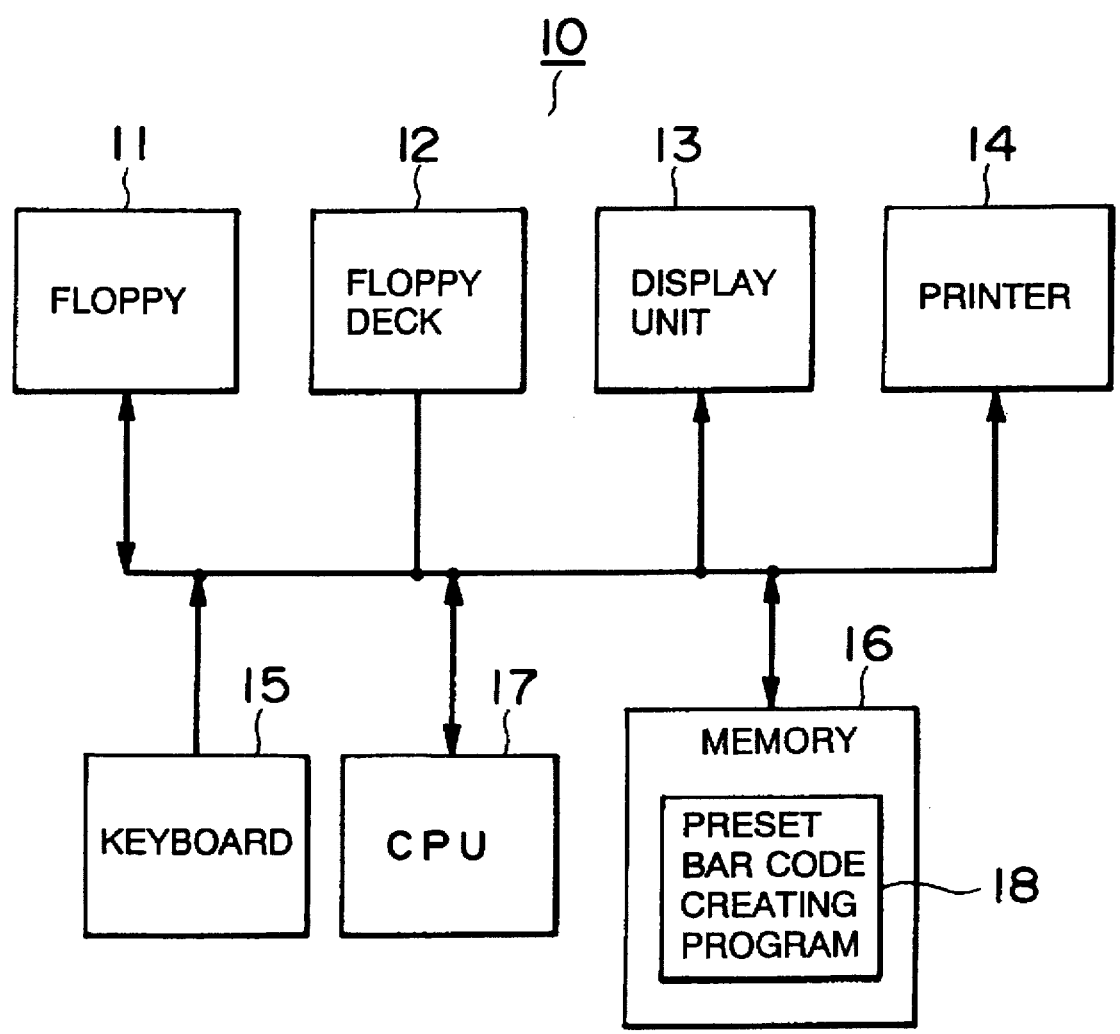
FIG. 5 is a diagram illustrating a hardware architecture of a preset bar code creating unit incorporated into the terminal device in accordance with third embodiment of the present invention.

The terminal device in the third embodiment is constructed of a preset bar code creating unit 10 and a preset setting unit 20. FIG. 5 is a diagram illustrating a hardware architecture of the preset bar code creating unit 10.

The preset bar code creating unit 10 creates the preset bar codes conforming with the user's conditions. The preset bar code creating unit 10 includes a floppy disk 11, a floppy deck 12, the display unit 13 and the printer 14.

The preset bar code creating unit 10 further includes a keyboard 15, a memory 16 and a CPU 17 for controlling the respective units.

The floppy 11 stores preset default values (hereinafter termed preset data). The floppy deck 12 takes in the floppy 11 and reads the preset data stored in the floppy 11.

The display unit 13 displays the preset data from the floppy deck 12 on its screen, and, at the same time, displays the preset data changed by an input from the keyboard 15. The keyboard 15 inputs a change value for changing the preset data displayed on the display unit 13.

The memory 16 stores a preset bar code creation program 18 for converting the inputted preset data and the changed preset data into the bar code data. The inputted preset data is inputted from key, is stored in a floppy disk. The preset data is inputted by setting in the terminal device.

The CPU 17 executes the preset bar code creation program 18 and thereby converts the inputted preset data and the changed preset data into the bar code data.

The printer 14 prints, on the sheet, the bar codes converted by the preset bar code creation program 18.

Figure 6:
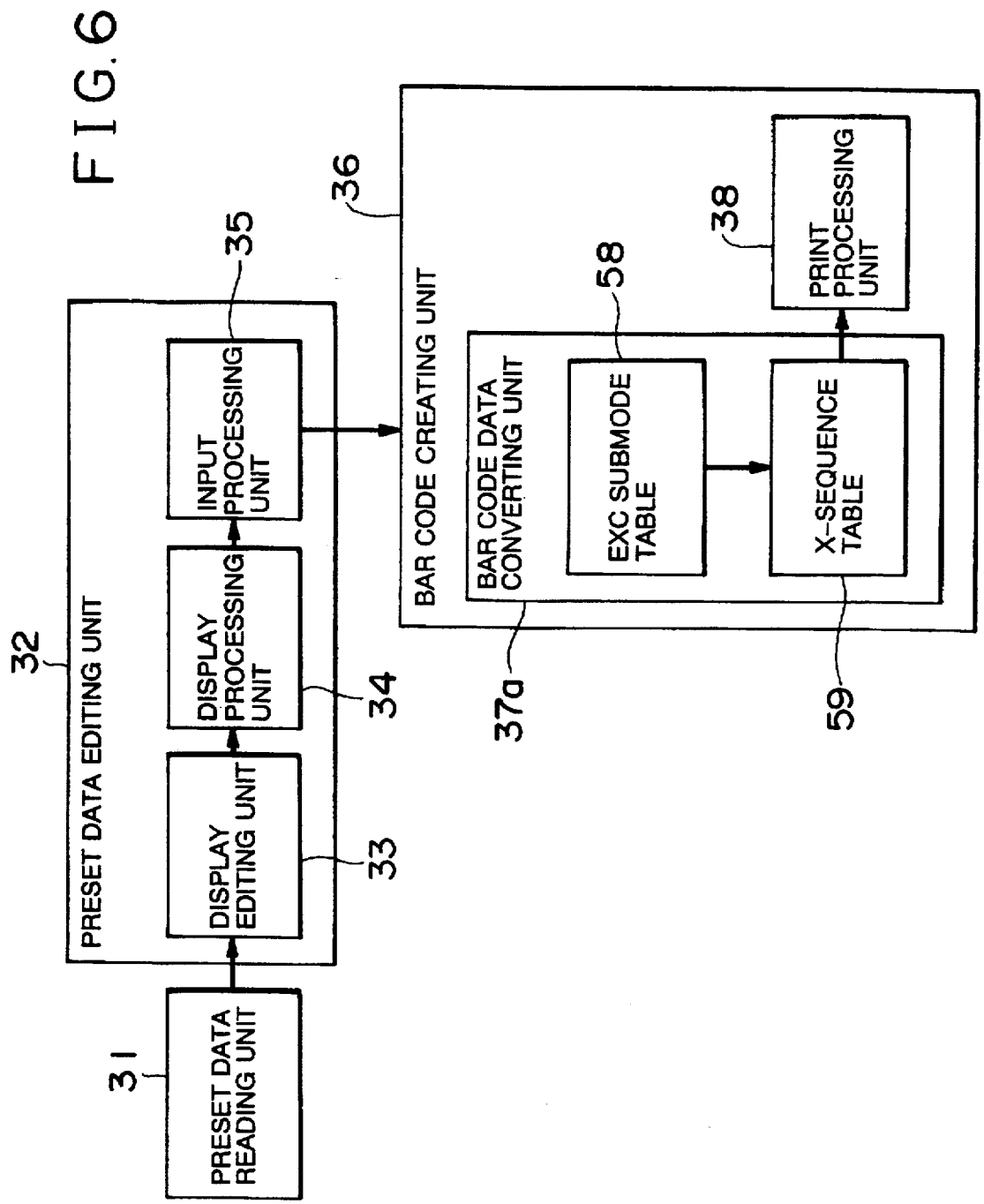
FIG. 6 is a diagram illustrating a software architecture of the preset bar code creating unit in the third embodiment.

FIG. 6 is a diagram illustrating a software architecture of the preset bar code creating unit. That is, the CPU 17 executes the preset bar code creation program 18 and thereby creates the bar code data from the preset data.

The preset bar code creating unit depicted in FIG. 6 has a preset data reading unit 31, a preset data editing unit 32 and a bar code creating unit 36.

The preset data reading unit 31 reads default preset data stored on the floppy 11. The preset data editing unit 32 is connected to the preset data reading unit 31.

The preset data editing unit 32, which causes the display unit 13 to display the read preset data, confirms and modifies these items of preset data. The preset data editing unit 32 is constructed of a display editing unit 33, a display processing unit 34 and an input processing unit 35.

The display editing unit 33 edits the preset data in order to display the read preset data on the screen. The display processing unit 34 is connected to the display editing unit 33.

The display processing unit 34 displays the preset data edited by the display editing unit 33 on the screen. The preset data displayed thereon is used for the confirmation thereof. The input processing unit 35 is connected to the display processing unit 34.

The input processing unit 35 modifies the preset data displayed on the screen in accordance with the change value for the preset data inputted from the keyboard 15. The bar code creating unit 36 is connected to the preset data editing unit 32.

The bar code creating unit 36 is constructed of a bar code data converting unit 37a and a print processing unit 38. The bar code data converting unit 37a converts the preset data processed by the input processing unit 35 into the bar codes undergoing binary-coded processing in the input processing unit 35.

The bar code data converting unit 37a is constructed of an EXC submode table 58 and an X-sequence table 59. The EXC submode table 58 and the X-sequence table 59 will hereinafter be explained in detail.

The print processing unit 38 is connected to the bar code data converting unit 37a. The print processing unit 38 prints the bar code data converted by the bar code data converting unit 37a in the form of two-dimensional bar codes. The two-dimensional bar codes will be discussed in detail with reference to FIG. 14.

Figure 7:
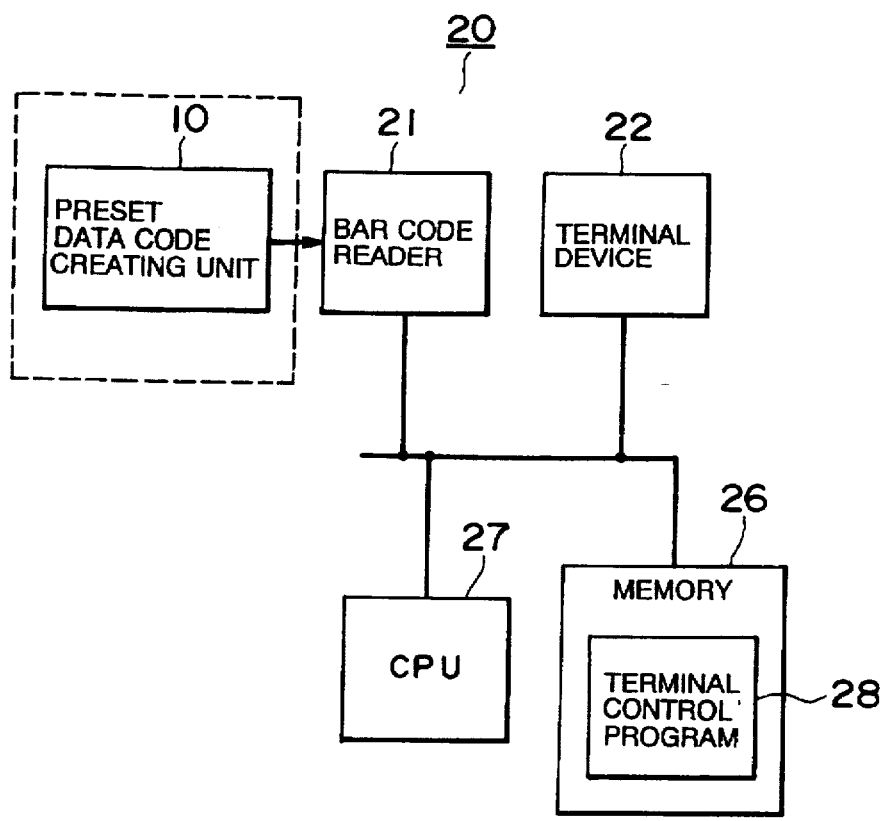
FIG. 7 is a diagram illustrating a hardware architecture of a preset setting unit incorporated into the terminal device in accordance with the third embodiment of the present invention.

FIG. 7 is a diagram illustrating a hardware architecture of the preset setting unit 20. Referring to FIG. 7, the preset setting unit 20 consists of a bar code reader 21, a terminal device 22, a memory 26 and a CPU 27 for controlling the individual units.

The bar code reader 21 reads the bar codes which have been printed by the print processing unit 38 within the preset bar code creating unit 10. The bar code reader 21 reads the bar codes by, e.g., scanning with laser beams. The terminal device 22 is connected to the bar code reader 21.

The memory 26 stores a terminal control program 28 for converting the bar code data into the preset data. The CPU 27 executes the terminal control program 28 and thereby converts the bar code data read by the bar code reader 21 into the preset data.

The terminal device 22 sets the converted preset data to an unillustrated memory incorporated into the terminal device 22. Next, condition of the terminal device is described.

Figure 8:
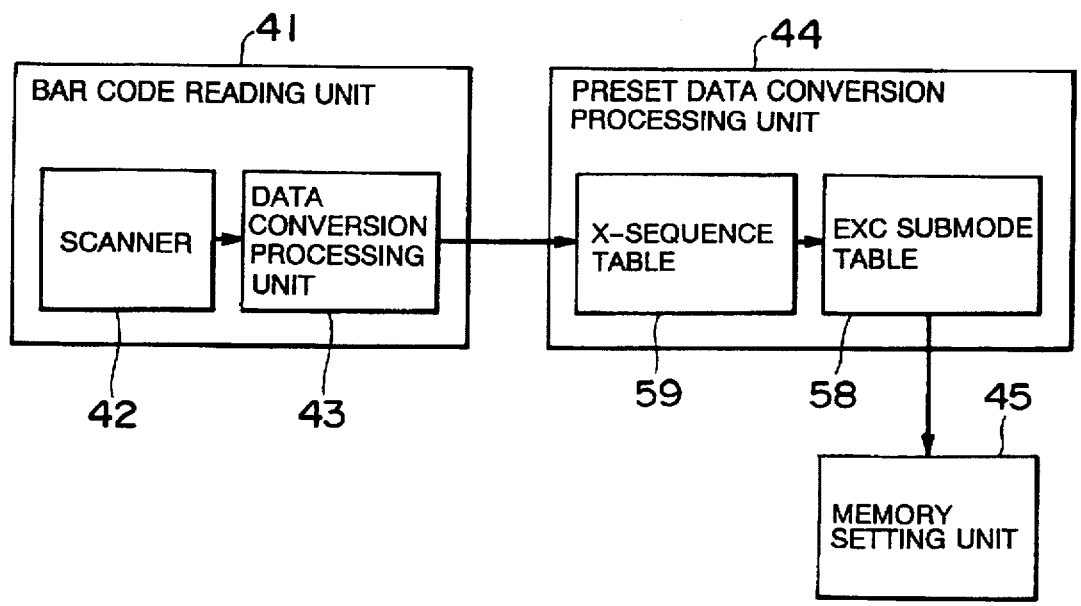
FIG. 8 is a diagram illustrating a software architecture of the preset setting unit in the third embodiment.

FIG. 8 is a diagram illustrating a software architecture of the preset setting unit 20. The preset setting unit 20 shown in FIG. 8 includes a bar code reading unit 41, a preset data conversion processing unit 44 and a memory setting unit 45.

The bar code reading unit 41 reads the bar codes created by the preset bar code creating unit 10. The bar code reading unit 41 is composed of a scanner 42 and a data conversion processing unit 43.

The scanner 42 scans the bar codes expressed based on bar width by laser beams from, e.g., an optical system. The data conversion processing unit 43 is connected to the scanner 42.

The data conversion processing unit 43 inputs the bar codes read by the scanner 42 and converts these bar codes into the bar code data.

The preset data conversion processing unit 44 is connected to the data conversion processing unit 43. The preset data conversion processing unit 44 converts the bar code data converted by the data conversion processing unit 43 into the preset data.

The preset data conversion processing unit 44 consists of the X-sequence table 59 and the EXC submode table 58. The X-sequence table 59 and the EXC submode table 58 will be fully explained later.

The memory setting unit 45 sets the preset data converted by the preset data conversion processing unit 44 to the memory within the terminal device 22.

Next, the two-dimensional bar codes will be fully discussed. FIG. 9 is a diagram showing one example of the two-dimensional bar codes. The two-dimensional bar codes are formed in such a way that letters and numerals are expressed by bar data in the lengthwise and crosswise directions. The number of record characters is, e.g., 2000 digits.

"PDF417" shown in FIG. 9A is by Symbol Technology. "DATACODE" shown in FIG. 9B is by an I. D Matrix. "VERICODE" shown in FIG. 9C is by VERITEC. "CODE16K" shown in FIG. 9D is by Laser Light Systems.

The two-dimensional bar codes may be pasted to a passport, a tag, an invoice, a security and a stock certificate and applicable to a variety of fields.

Figure 10:
FIG. 10 is a diagram showing one example of one-dimensional bar codes in the third embodiment.

In the embodiment 3, "PDF417" shown in FIG. 9A is employed. "PDF417" has a data quantity that is more than 100 times as large as the one-dimensional bar codes (JAN (Japanese Article Number)), UPC (Universal Product Code) etc. shown in FIG. 10. "PDF417" has 925 pieces of code words at the maximum. The code word is a basic unit code.

Note that "PDF417" corresponds to 1850 characters in the form of, e.g., alphanumeric characters and special characters but corresponds to 1108 bytes in a binary/ASCII plus mode. In "PDF417", recovery levels of 9 stages are selected in accordance with operating environments, and, therefore, the number of error-correctable code words is large.

Figure 11:
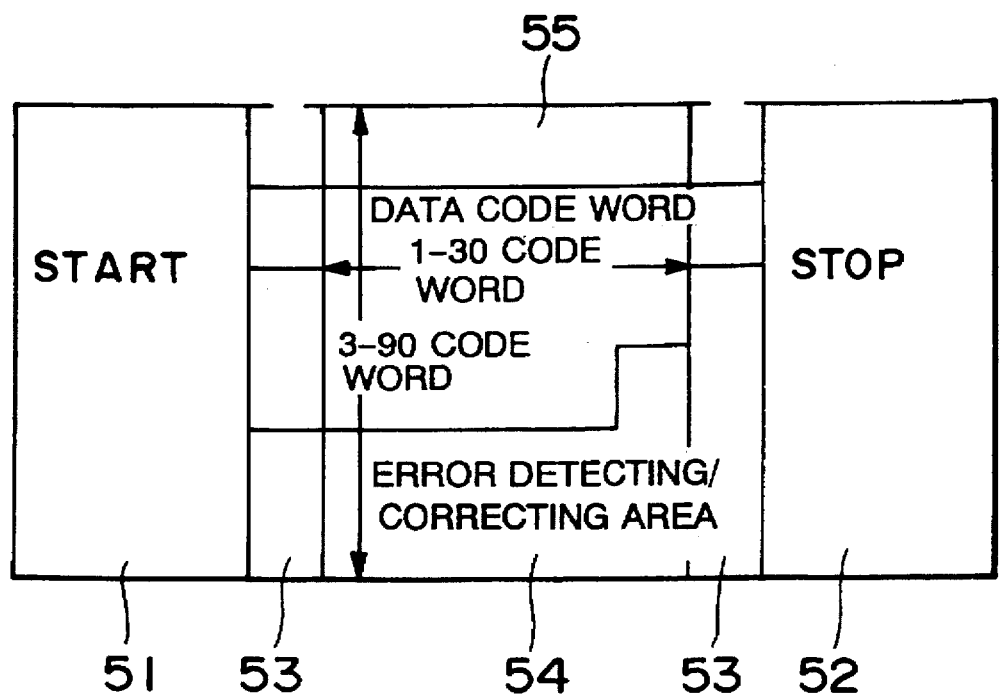
FIG. 11 is a diagram showing a symbol structure of the two-dimensional bar codes in the third embodiment.

FIG. 11 is a diagram illustrating a symbol configuration of the two-dimensional bar codes. The two-dimensional bar code includes a start bar 51 at the left end and a stop bar 52 at the right end.

The two-dimensional bar code has row indicators 53 provided inwardly of the start bar 51 and the stop bar 52. The row indicator 53 shows a definition of the symbol configuration, which number of the row and what number of rows and columns to configure.

Further, the two-dimensional bar code is provided with an error detection code word 54 and a plurality of code words 55. The code words 55 is composed of one or more code words and further 30 code words at the maximum per row (horizontal direction). The code words 55 is composed of three or more code words and further 90 code words at the maximum per symbol (vertical direction).

Figures 12, 13:
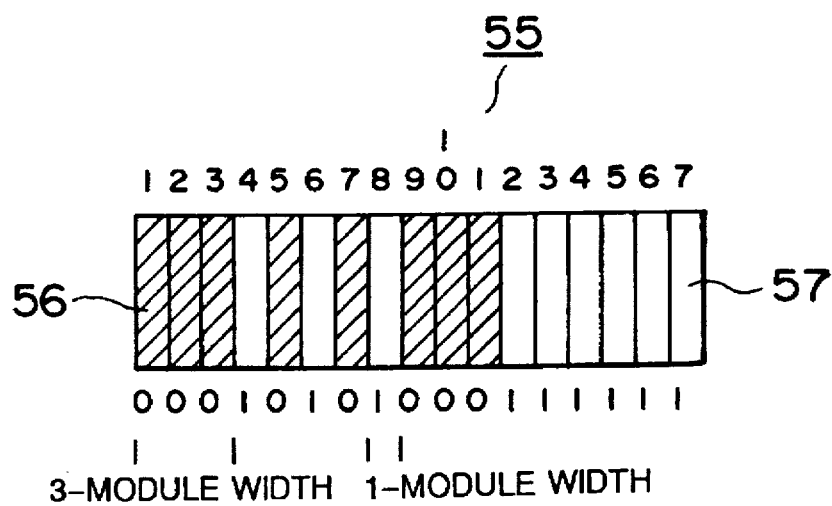
FIG. 12 is a diagram showing a structure of a code word in the third embodiment.
FIG. 13 is a diagram showing an EXC submode table in the third embodiment.

The code word 55 is composed of 17 minimum modules as shown in FIG. 12. The code word 55 starts with a bar 56 shown in black but ends with a space 57 shown in white. The code word 55 is configured by sequentially repeating the bar 56 and the space 57 four times.

In the example shown in FIG. 12, a string of 17 modules is constructed of '31111136' modules. The high-order one digit numeral '3' in the module string indicates that a width of the bar 56 is 3 modules. Note that a value of the bar 56 is '0', while a value of the space 57 is '1'.

The EXC (Extended Alphanumeric Compaction) submode table 58 shown in FIG. 13 is employed for converting the alphanumeric characters and the special characters as the preset data into the code words 55.

The EXC submode table 58 classifies the alphanumeric characters and the special characters (ASCII codes) into four submodes of an alphabetic capital letter, an alphabetic small letter, a mixture of a numeral and a special symbol, and a special character. The EXC submode table 58 make two characters corresponding to one code word.

The two characters are, for example, (F, U), (J, I), (T, S), (U, _), (L, ll), (i, m), (i, t), (e, d), etc.. The two characters are properly combined. The EXC submode table 58 serves to convert the two characters into numeric values.

The converted numeric values are, for example, (5, 20), (9, 8), (19, 18), (20, 26), (11, 27), (8, 12), (8, 19) and (4, 3).

The EXC submode table 58 converts these numeric values into the code words by effecting a calculation of the formula (1) by use of the first numeral and second numeral.

$$\text{First Numeral} \times 30 + \text{Second Numeral} \qquad (1)$$

For example, the numeric value (5, 20) becomes 170 in the code word. Similarly, other code words are (278), (588), (626), (357), (252), (259) and (123).

The X-sequence table 59 serves to convert the code word values obtained by the EXC submode table 58 into a module string consisting of the bars 56 and the spaces 57. The module string is known as an X-sequence. FIG. 14 illustrates the X-sequence table 59.

The X-sequence of the code word 55 shown in FIG. 12 is '31111136'. The X-sequence table 59 makes the code word value '0' corresponding to the X-sequence '31111136'.

As shown in FIG. 14, the X-sequence table 59 is constructed of subtables 59a–59c. In the subtable 59a, code word values 0–900 correspond to a cluster number 0. In the subtable 59b, the code word values 0–900 correspond to a cluster number 3. In the subtable 59c, the code word values 0–900 correspond to a cluster number 6.

The X-sequence subtables 59a–59c convert the respective code words into the X-sequence and, at the same time, convert the bars and spaces that are read by the bar code reader 21 into the code word values.

When the X-sequence subtables 59a–59c convert the code word values into the X-sequence, any cluster number is employed. In this case, a relationship between the each code word, the row number and the cluster number is defined by the following formula (2):

$$\text{Cluster Number} = (\text{Row Number}) \bmod 3 \times 3 \qquad (2)$$

Based on the formula (2), if the row number is, e.g., 0, 1, 2, 3, 4 and 5, the cluster number becomes 0, 3, 6, 0, 3 and 6.

With this processing, when the 0th code word value is converted, the subtable 59a corresponding to the cluster number 0 is employed. When converting the 1st code word value, there is used the subtable 59b corresponding to the cluster number 3.

When converting the 2nd code word value, the subtable 59c corresponding to the cluster number 6 is used.

Further, when the X-sequence subtables 59a–59c serve to convert the X-sequences into the code words, any cluster number is employed. A relationship between the X-sequence and the cluster number is defined by the following formula (3):

$$\text{Cluster Number} = (X_0 - X_2 + X_4 - X_6) \bmod 9 \qquad (3)$$

If a value of the formula (3) is negative, the cluster number is a 9's complement. For example, when the X-sequence is '31111136', $X_0$ is 3; $X_2$ is 1; $X_4$ is 1; and $X_6$ is 3.

Accordingly, from the formula (3), the cluster number is (3−1+1−3) mod9 and consequently turns out 0. In this case, the code word value becomes '0' by use of the subtable 59a.

Operation of Embodiment 3

Next, the preset setting method in accordance with the third embodiment will be explained. To begin with, the creation of the preset bar codes will be described. FIG. 15 is a flowchart showing the preset bar code creating method in accordance with the third embodiment of this invention.

The bar code creating unit 10 creates the preset bar codes conforming with the user's conditions. For instance, the preset bar codes are created in a factory or a place such as a head office of the user.

Herein, first, when the floppy 11 is taken in by the floppy deck 12, the preset data reading unit 31 reads package preset default values (preset data) stored on the floppy 11 (step 301).

Next, the display editing unit 33 edits the preset data read by the preset data reading unit 31 into data suited to the display unit 13 (step 302).

Then, the display processing unit 34 displays the preset data edited by the display editing unit 33 on the screen (step 303).

Items and set values corresponding to these items are displayed in the form of the inputted preset data on the screen as shown in, e.g., FIG. 16. The set value for a password input is, e.g., 3, and a set value for an issuance base amount is 200.

Next, a change value for changing the preset data is inputted from the keyboard 15. The input processing unit 35 changes the preset data displayed on the display unit 13 to preset data conforming with the user's conditions in accordance with the change value (step 304).

The changed preset data is, for example, as illustrated in FIG. 17, displayed. Herein, for example, the set value for the password input is changed to 1. The set value 200 for the issuance base amount is changed to 100.

Note that if there is no necessity for changing the preset data, the inputted preset data is a target for conversion.

Next, the input processing unit 35 determines whether or not an unillustrated end key provided in the keyboard 15 is depressed (step 305). If the end key is not depressed, there must be a wait till the end key is depressed.

If the end key is depressed, the bar code data converting unit 37a converts the preset data having contents displayed at that point of time into bar code data (step 306).

That is, the inputted preset data or the changed preset data is converted into the bar code data. Herein, the numerals in the form of the preset data are converted into the code word values by use of the formula (1) and the EXC submode table 58 shown in FIG. 13.

Then, the code word values are converted into the X-sequence by use of the formula (2) and the X-sequence table 59.

Further, the print processing unit 38 outputs the bar code data defined as the X-sequence to the printer 14 in the form of the bar codes (step 307). The two-dimensional bar codes as shown in FIG. 9A are thereby printed.

Also, changing the preset data may involve the use of the following methods.

For example, the preset data shown in FIG. 16 is not changed, but, as illustrated in FIG. 18, a list of the unchanged preset data is printed. Besides, the two-dimensional bar codes including the unchanged preset data are printed.

Next, when the bar code reader 21 which will be mentioned later is connected to the preset bar code creating unit 10, the bar code reader 21 reads the created bar codes.

Then, the preset data conversion processing unit 44 which will be stated later converts the bar codes into the preset data and, similarly when creating the bar codes, displays the preset data on the screen of the display unit 13.

Further, the preset data may be changed as shown in, e.g., FIG. 17 while seeing all the preset data.

Figure 19:
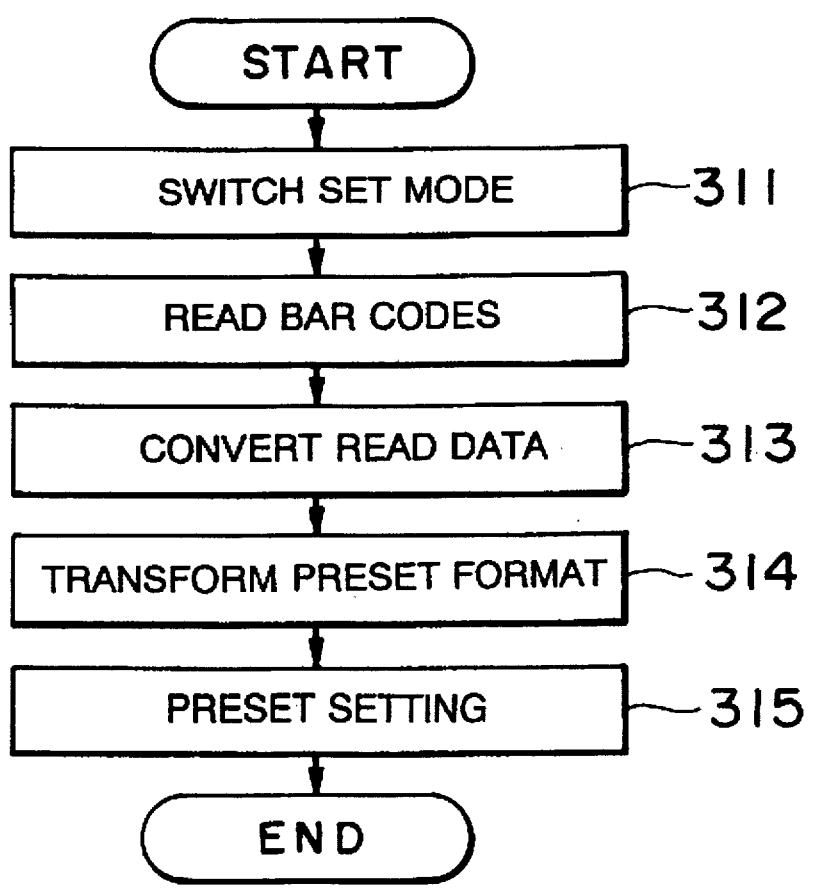
FIG. 19 is a flowchart showing a preset data setting method in accordance with the third embodiment of the present invention.

Next, the setting of the preset data to the terminal device 22 will be explained. FIG. 19 is a flowchart showing the setting of the preset data.

Herein, the created preset bar codes are brought into shops and the like where the respective terminal devices 22 are installed, and the bar code readers 21 are connected to the terminal devices 22. Then, new items of preset data are set to the respective terminal devices.

First, the terminal device 22 is switched to a setting mode (step 311). Next, the bar code reader 21 reads the preset bar codes printed by the printer 14 incorporated into the bar code creating unit 10.

In this case, the scanner 42 scan-reads the preset bar codes (step 312). The data conversion processing unit 43 converts the preset bar code into the bar code data (step 313). This item of bar code data turns out to be the above-described X-sequence.

Next, the preset data conversion processing unit 44 converts the bar code data into the preset data (step 314). Herein, the X-sequences conceived as the bar code data are converted into code word values by use of X-sequence subtables 59a–59c shown in FIG. 14.

Then, the converted code word values are converted into alphanumeric characters by using the EXC submode table 58 shown in FIG. 13. Namely, the bar code data are converted into the preset data.

Further, the memory setting unit 45 sets the preset data read by the bar code reader 21 to the memory incorporated into the terminal device 22 (step 315). In this manner, the preset setting unit 20 sets the new preset data to the respective terminal devices 22.

As described above, according to the third embodiment, the operator sets the preset data by use of the keyboard 15 while seeing the screen. These items of preset data are bar-coded.

The preset bar codes are the two-dimensional bar codes including the plural items of preset data, and the plural items of preset data can be therefore batch-read.

Also, according to the prior art, the plural items of preset data are set to the terminal device 22 by manual inputting from the keyboard 15. In accordance with the embodiment 3, the plural items of preset data can be batch-read.

Accordingly, the plural items of preset data can be quickly easily set to the terminal device 22 without the key inputting. As a result, reductions both in time and in mistake can be attained.

Further, when the users individually employ the package software under different conditions, and if the preset bar codes corresponding to the respective conditions are created, there is no necessity for creating individual install floppies. For this reason, there is decreased a burden on the program management on the maker's side.

Moreover, if all the preset datas are converted into the preset bar codes, the preset bar codes read by the bar code reader are converted into the preset data and can be set to the terminal device.

Hence, it is unnecessary to, as done in the prior art, set the preset data from the host computer to the terminal device. That is, the preset data can be set offline to the terminal device.

Note that the same terminal device is provided with the preset bar code creating unit 10 and the preset setting unit 20 in the embodiment 3. For example, the preset bar code creating unit 10 and the preset setting unit 20 may be provided in separate terminal devices, respectively.

It is apparent that, in this invention, a wide range of different working modes can be formed based on the invention without deviating from the spirit and scope of the invention. This invention is not restricted by its specific working modes except being limited by the appended claims.

What is claimed is:

1. A terminal device comprising:

memory means for storing preset data which sets condition of the terminal device;

changing means for changing the preset data stored in said memory means into new items of preset data;

converting means for converting the new items of preset data stored in said memory means into bar code data necessary to output a bar code;

printing means for outputting the bar code based on the bar code data converted by said converting means;

bar code reading means for reading the bar codes printed by said printing means; and creating means for creating new preset data from the bar codes read by said bar code reading means and setting the operating condition of the terminal device from the new preset data and storing the new preset data as preset data.

2. A terminal device according to claim 1, wherein the bar codes outputted from said printing means are two-dimensional bar codes inclusive of a plurality of code words in lengthwise and crosswise directions respectively, and each code word is composed of a module string in which bars and spaces are combined.

3. A terminal device according to claim 2, further comprising display means for displaying the preset data stored in said memory means.

4. A terminal device according to claim 2, wherein said converting means includes:

a first table for converting the preset data into numerical values of the code words; and a second table for converting the numerical values of the code words into values of widths of bars and spaces that are alternately arranged in the module string.

5. A terminal device according to claim 2, wherein said creating means includes:

a first table for converting the values of the widths of the bars and the spaces that are read by said bar code reading means into the numerical values of the code words; and a second table for converting the numerical values of the code words into the preset data.

6. A data setting method comprising:

a storing step of storing preset data which sets an operating condition of a terminal device, in said terminal device;

changing step for changing the preset data stored in said storing step into new items of preset data;

a converting step of converting the new items of preset data stored in said storing step into bar code data necessary to output a bar code;

a printing step of outputting the bar code based on the bar code data converted in said converting step;

a bar code reading step of reading the bar codes printed in said printing step; and a creating step of creating new preset data from the bar codes read in said bar code reading step and setting the operating condition of the terminal from the new preset data.

7. A data setting method according to claim 6, wherein the bar codes outputted in said printing step are two-dimensional bar codes inclusive of a plurality of code words in lengthwise and crosswise directions respectively, and each code word is composed of a module string in which bars and spaces are combined.

8. A data setting method according to claim 7, further comprising displaying step for displaying the preset data stored in said storing step.

9. A data setting method according to claim 7, wherein said converting step includes:

a step of creating a first table for converting the preset data into numerical values of the code words; and a step of creating a second table for converting the numerical values of the code words into values of widths of bars and spaces that are alternately arranged in the module string.

10. A data setting method according to claim 7, wherein said creating step includes:

a step of creating a first table for converting the values of the widths of the bars and the spaces that are read by said bar code reading step into the numerical values of the code words; and a step of creating a second table for converting the numerical values of the code words into the preset data.

* * * * *

UNITED STATES PATENT AND TRADEMARK OFFICE
CERTIFICATE OF CORRECTION

PATENT NO. : 5,635,698
DATED : June 3, 1997
INVENTOR(S) : Kyouko TERADA

It is certified that error appears in the above-indentified patent and that said Letters Patent is hereby corrected as shown below:

<u>Cover Page:</u> Item [56]
OTHER PUBLICATIONS, line 1, change "IUTEUNEC" to --INTERMEC--;
change "INTERCEC" to --INTERMEC--.

Col. 13, line 36, after "sets" insert --an operating--;

Signed and Sealed this

Sixteenth Day of September, 1997

Attest:

Attesting Officer

BRUCE LEHMAN

*Commissioner of Patents and Trademarks*